Patented Feb. 1, 1927.

1,616,055

UNITED STATES PATENT OFFICE.

AUGUST MARKS, OF CARTERET, NEW JERSEY, ASSIGNOR TO UNITED STATES METALS REFINING COMPANY, A CORPORATION OF NEW JERSEY.

MAGNESITE REFRACTORY AND METHOD OF MAKING THE SAME.

No Drawing.  Application filed June 8, 1926. Serial No. 114,566.

This invention relates to molded magnesite refractories and a method of making the same.

Magnesite bricks and other molded refractories possess many very desirable qualities as high temperature refractories, and are very widely used in metallurgical work, as for the lining of furnaces, converters, settlers, ladles, etc., but have serious disadvantages in the susceptibility to cracking and crumbling or spalling, absorption of metals, and expansion when heated. The present invention provides a magnesite brick or similar molded magnesite refractory wherein the spalling and expansion are much lessened, and a very durable and high quality of magnesite brick or other molded refractory is produced. The magnesite refractories according to the present invention also have a dense structure which is less absorptive of liquids—such as molten metals—and have less voids than magnesite refractories heretofore in use.

According to the present invention the magnesitic body material is ground and otherwise prepared according to any suitable or known method for use in the manufacture of refractories. The body material is then mixed with a suitable oil, such as linseed oil, to form a plastic mass, being preferably well mixed or kneaded, as is usual in the preparation of the plastic for molding bricks, etc. Prior to mixing with the oil, the body material is preferably dried at a temperature sufficient to drive off such excess moisture as may be contained therein.

The plastic mass is then molded into forms or shapes as may be desired, as, for example, bricks, lining titles, crucibles, furnace shapes, muffles, retorts, zinc retorts, etc., the molding being preferably effected or completed under pressure in a hydraulic press.

The bricks, etc. are then subjected to a drying operation, to render them sufficiently dry and firm to enable them to be properly burned.

The molded articles are then taken to a kiln or oven, stacked in appropriate and usual manner, and burned according to usual practice, the burning being preferably such as to produce what is known as a hard burned article, the temperature and time of burning being controlled by the nature of the body material and such fluxes as may be contained in the mix. In the heating, while the temperatures are gradually increased at first, nevertheless the temperatures can be relatively quickly brought to the upper ranges as compared with the burning of articles formed from plastics containing water.

After burning and cooling, the bricks, etc. are removed from the kiln ready for use.

A variety of oils may be used. Vegetable oils such as linseed oil, cotton seed oil, etc. may be used; and certain animal oils such as fish oil or other oils having similar properties, may be used.

The resulting refractories have a greater density and hardness, less voids, a finer crystalline structure, a finer ring when struck, a less absorption of liquid metal, less expansion under heat and greater durability in use, as compared with others in the same class produced by previous methods.

A specific example of the process, as applied to the manufacture of magnesite brick, will now be given.

Dead burned magnesite (magnesite rock burned to drive off the carbon dioxid contained therein), preferably of the Austrian variety, is preferably first dried by heating to drive off such moisture as may be contained therein, and is then finely ground. In practice the burned magnesite should be ground to a fineness such that a large proportion will pass through a screen of 100 mesh per lineal inch. In general, the finer the size of the ground particles the better will be the refractory produced.

Linseed oil is then added to the ground burned magnesite and thoroughly mixed in a mixing pan to a plastic mass suitable for molding. In practice one gallon of oil may be used to about 117 pounds of magnesite. The amount of oil used may vary somewhat, however, depending on various factors.

The plastic mass is then put into forms or molds and subjected to a suitable pressure to form it into bricks, tiles, or other molded articles; it is preferable to use hydraulic pressure, as in the ordinary molding of water-bonded magnesite bricks.

The bricks, etc. after molding are preferably subjected to a gradual drying process. The pressed bricks, etc. are then placed in a kiln and burned in the usual or any well-known manner.

The superior qualities of the resulting bricks, etc. appear to be due to the oxidation and decomposition of the oil, and the action of the decomposition products on the body material, which either effects an autogenous binding or produces substances which act as binders.

(The foregoing description is taken from my application Serial No. 754,983, filed December 10, 1924, of which the present application is a continuation, and which it replaces, the present application being filed to introduce certain additional matter which is the result of subsequent experience in the practice of the invention).

As the body material, any suitable magnesite refractories may be used. Magnesite refractories are those made from magnesitic material, that is, wholly or largely of magnesite. Suitable results are secured by using one-half Austrian and one-half American magnesite. The magnesitic material requires to be dead burned, and before grinding should be dried to drive off any excess of moisture which may be contained therein; but moisture not exceeding 0.5 per cent is not objectionable. It should be ground to such fineness that it will substantially all pass through a 20 or 30 mesh screen, and approximately half will pass through a 100 mesh screen. It is preferable for the best results that there should be a certain diversity in the sizes of the ground particles so that the finer particles may enter into the spaces or voids between the coarser particles, whereby to give the greatest density, strength and permanence to the brick. This result may be attained by mixing or blending magnesite of different degrees of fineness; or it may be attained by the common methods of grinding if the process is conducted skillfully to that end. A typical screen analysis of a suitable material substantially all of which will pass through a 20 mesh screen, will give approximately 40 per cent not passing through a 60 mesh screen, about 45 per cent passing a 100 mesh screen, and the difference in intermediate sizes.

The oil to be used should be a siccative oil having fatty or lubricating properties. Linseed oil is preferable; and either raw or boiled oil may be used, according to choice, as hereinafter stated. Other vegetable oils having siccative properties resembling those of linseed oil may be used; and certain animal oils having similar siccative properties are suitable, but in the use of such other oils it is preferable to combine them with linseed oil in some suitable proportion. Suitable oxidizing or catalytic dryers such as oxides of lead, cobalt, manganese, etc., may be used to accelerate the drying. In general, any good linseed oil substitute may be used, of which several are known in the art, all of which are made up largely of siccative oils, and the best of which contain a considerable proportion of linseed oil. Mineral oils and petroleum distillates such as tar or the like, are unsuitable. But the lighter mineral oils may be used to a moderate extent as thinners; this, however, is needless with a suitably-chosen oil.

The proportion of oil used is important. The best amount of oil may vary with the nature and quality of the oil, the fineness of the grinding of the magnesite, and the quality or origin of the magnesite. With magnesitic material of the nature and fineness hereinbefore stated, it is found that to 100 pounds of such material, good results are secured by using from five to seven pounds of linseed oil, and the best results with about six and one-half pounds of such oil, or 6.5 per cent. With other oils or other grades of magnesitic material, the proportion should be varied according to circumstances to secure the best results, which can only be determined by experiment. Generally, if less than three or four per cent of oil is used, or if more than eight or nine per cent is used, failure will result. With too little oil, the body material is not sufficiently bonded for proper molding and the molded forms cannot be properly handled to the kiln and the burned articles are lacking in strength and density. On the other hand, if too much oil is used, the plastic mass becomes too soft and sticky for proper molding and is liable to lose its shape before firing, and to blister during firing.

After the oil is added to the magnesite, these ingredients are to be thoroughly mixed until a homogeneous plastic mass is produced. This mixing is best done in the usual mixing pan or "wet pan" or pug mill. This mixing or pugging operation usually takes longer than for water-bonded magnesite; according to conditions it may take from one and one-half to three times as long to secure a thoroughly homogeneous blend.

The plastic mass may be immediately molded, or the molding may be delayed for some length of time. In some instances it is desirable to "cure" the plastic mass before molding by letting it stand a few hours, or even a day. During this time the linseed oil partially hardens by oxidation and by reaction with magnesite constituents, so that the mass acquires greater coherence. This is desirable if the conditions are such that the plastic is too soft and sticky for proper molding. In practice, however, by using the best grade and fineness of body material and the most suitable oil, and the best percentage of oil to body material, a plastic mass may be produced which may be molded immediately or as soon as convenient.

The molding of the bricks or other forms may be performed in any usual molds or molding press. While successful results may be attained by molding by hand, and without a press or pressure otherwise than by giving the mold follower a blow with a mallet, as is commonly done by molders, yet the best results are had by using a press, preferably a hydraulic press, and imparting a pressure of from 1200 to 1500 pounds per square inch. This pressure molding gives the greatest density and the least porosity and absorptive property in the finished refractory.

The bricks or other forms after being taken from the molds should then be dried to substantial hardness. Failure will result if the firing is performed before the bricks are adequately dried. This drying may be variously performed, but it is suitable to expose the bricks or other articles in the open air, stacking them so that they are separated from one another and exposed on all sides except the bottom to the air. During the drying, the hardening of the brick by the siccative action of the oil continues progressively until the brick has become thoroughly dry and sufficiently hard all through. As soon as the bricks are firm and dense and to all appearance dry, they may at once go into the kiln for burning; but better results are secured by subjecting the bricks to a prolonged period of drying, which may continue for a week or more, or as long as it is convenient to store the bricks in the manner stated. During this prolonged drying the hardening of the brick by the completion of the siccative action of the oil is effected, and the brick becomes thoroughly dry and hard all through; it then is apparently as hard and dense as an ordinary water-bonded brick which has been burned. Under test it exhibits a considerable approach toward the strength of such burned magnesite bricks.

These unburned bricks may be built into a furnace or converter as the lining thereof, and accord in most instances quite as desirable a lining as the ordinary water-bonded burned magnesite brick. The bricks become fired in the heating up of the furnace or converter, and this method gives very good results. (The unburned oil-bonded magnesite bricks thus produced are not claimed in the present application, being the subject of a separate application filed May 6, 1926, Serial No. 107,307).

The pressed and dried bricks produced preferably in the manner hereinabove described are then fired by placing in a kiln and burning in the usual or any well-known manner. The burning of the bricks requires no different treatment from that of the ordinary water-bonded magnesite bricks. From the first firing up until the final cooling down and unloading, requires, as usual, about ten or twelve days. The temperature required is substantially the same as for water-bonded magnesite bricks, rising gradually to a maximum of say from 1400° to 1500° C.

The magnesite bricks produced are smooth, regular in shape, hard and dense, and consist of a mass of small interlocked crystals, and, as before mentioned, the bricks are very durable, and cracking and spalling, expansion under heating, absorption of liquid metals, and corrosion by metals or gases, are very materially lessened. Magnesite bricks produced according to the present invention are found to have on the average a lower percentage of voids and a smaller coefficient of expansion as compared with the best grades of magnesite bricks manufactured by present methods. The life of these bricks as compared with the ordinary water-bonded magnesite bricks is decidedly greater, but the difference depends so much upon local or special conditions that it is difficult to state it with exactness. In copper refining, where the bricks are exposed at and below the level of the molten metal, they endure for more than twice, and in some cases from four to six times, as long as the ordinary bricks used under similar conditions. When not exposed to molten metal their life exceeds that of ordinary magnesite bricks by from two to six times.

In the use of linseed oil, as to whether raw or boiled oil should be used depends upon the procedure which it is desired to follow. In a works equipped for producing water-bonded magnesite bricks, it will be most convenient to use raw oil, in which case the mix will be in usual course left in a storage bin for a few hours to properly cure or set, and then molded in the usual manner, after which it should be passed through the dryers usually employed. In such dryers the bricks are first subjected to a moist atmosphere and moderate heat, and later, gradually to dryer air and higher heat, until they are fully dried. The total period of drying may vary according to circumstances, but will ordinarily take from 60 to 80 hours. At the end of this drying or curing operation the brick is firm and dense, and to all appearances dried. It is, however, desirable to thereafter subject the bricks to a somewhat prolonged drying in the open air, which may continue for several days, or as long as convenient.

If boiled linseed oil is used, no preliminary curing of the mix is desirable, and it may be immediately molded. The molded bricks do not require to be passed through a dryer, but may be dried readily in the open air. A drying of about one day is sufficient for curing, after which the bricks may be immediately fired; but it is advantageous to prolong the drying for several days, if it is convenient to thus store the molded bricks.

Advantageous results are secured by using a mixture or blend of raw and boiled oils, for which purpose from one quarter to one-third of boiled oil results when mixed with the magnesite in producing a plastic mass which may be molded almost immediately, although even then it is advantageous to let the mix cure for a short time before molding. Another way in which raw oil may be successfully used is to preliminarily heat the oil for a few hours at a temperature of 85–100° C., whereby it is conditioned to a sufficient approximation to boiled oil to produce a plastic mass which is not too sticky for immediate molding. This conditioning, however, may be better effected after admixture with the magnesite, either by leaving the mix to cure, or by moderate heating; in either case the raw oil assumes the properties of boiled oil. The same conditioning result is secured after the molding by heating the molded bricks in the dryer. It is thus a matter of choice or convenience in the manufacture as to whether the linseed oil is first boiled or otherwise conditioned before mixing; or is mixed in the raw state with magnesite, and the plastic mass left standing for a sufficient time; or a blend of raw and boiled oils is used; or however the plastic mass may be brought to condition for molding, the conditioning may be performed by heating the molded bricks. Thus, the necessary conditioning or curing may take place either before the oil is used or after its admixture with the magnesite, or even after molding, the precise method being governed largely by convenience and the desired manufacturing procedure.

The properties valuable in the oil binder are: (1) That the oil be a fatty oil, the characteristic of which is its ability to penetrate into the pores of dry substances so as to wet the surfaces of the particles thereof. The oil thus covers the grains with a film. (2) That the oil have an effective lubricating property, so that it enables the particles to slip past one another both in the mixing pan and under pressure in the molds, thus enabling the pressure to compact the particles closely together to afford in the mass the maximum density and the minimum porosity. This is partly due, when the material is ground to varying degrees of fineness, as above described, to the finer particles entering into the voids between the coarser particles and substantially filling these voids. (3) That the oil give plasticity to the magnesite, which is itself a non-plastic material, whereby it is made workable in a manner somewhat resembling clay; this greatly facilitates the mixing and molding. (4) That the oil have a siccative or self-drying property whereby it constitutes a self-hardening bond between the particles, so that the bricks, after being molded and before burning, gradually harden. Apparently any oil having this siccative property to a suitable degree has also the other properties first mentioned. (5) That the oil have a reaction with constitutents of the magnesitic body material, whereby an effective permanent bond is afforded. It is found that such reaction occurs between linseed oil and dead-burned magnesite, forming products which cement together the particles of magnesite.

While the various actions accompanying the use of such oil are not definitely determined, there is reason to believe that the following take place:—During the mixing the oil coats the grains in thin films and thereby comes into intimate contact with the finely-divided magnesite. Spontaneous oxidation sets in, wherein the esters of the oil unite with oxygen,—mainly from the atmosphere,—which together with other reactions, generates heat. The described mixture of magnesite and oil standing for 24 hours at atmospheric temperature develops an increased temperature of 10° C. or more, with the evolution of a pungent and penetrating odor. Tests of linseed oil alone and mixed with magnesite show a considerably higher acquired temperature in the mixture than in the oil alone, indicating a reaction peculiar to the magnesite; (this is confirmed by tests of mixtures of the oil with pulverized fire-clay brick (an inert material) with which under like conditions the increased temperature was 6° C.). It is known that on oxidation of linseed oil there is an increase of its acidity, by development of unsaturated fatty acids, and in the presence of bases this results in saponification. Magnesite contains mainly MgO, with small proportions of other bases, and these supply the basic material for neutralizing the acids developed in the oil, the resulting salts being intimately distributed throughout the product. Thus the result of combining linseed oil with magnesite is that an aggregate of the magnesite particles is produced, the particles being cemented together not only by the hardened oil, but also by the magnesitic salts which result from the reaction of the fatty acids with MgO and other bases in the magnesite. What occurs during the burning of the bricks cannot be exactly stated, but apparently in addition to the carbonization of the hardened oil the magnesite salts are reduced to their mineral constituents, with perhaps some crystallizing action, whereby they enter into permanent relation with the constituents of the magnesite and contribute largely to the formation of a permanent bond.

As compared with the standard method of producing magnesite bricks by a bond of water, the present invention has important advantages. With a water-bonded brick the water causes hydration of MgO, resulting in enlargement due to the greater mass of the magnesium hydrate, which tends to crack the brick. In the water-bonded brick during drying and burning a certain volume of steam is produced, partly at a high temperature, by the decomposition of $Mg(OH)_2$, which is liable to disrupt the structure, producing minute fissures which subsequently under temperature changes lead to the cracking and spalling of the bricks. With the oil-bonded brick, on the contrary, any traces of free moisture and the chemically-combined water are expelled at comparatively low temperatures. There is no tendency to enlargement or to the formation of fissures, if the method is correctly followed. Microscopic and petrographic examination of bricks made of precisely like magnesite mixes ground to the same finenesses and treated alike throughout, except that the one was made with a water-bond in the ordinary manner, and the other with an oil bond according to the present invention, gave the following results:—(1) The water-bonded brick was composed of grains of periclase averaging about 0.15 mm. cemented with crystalline matter having the characteristics of olivine (forsterite) and monticellite. The individual grains were saturated with iron oxide, and were firmly cemented together into aggregate groups, but the groups or aggregated grains were not so well bound together, so that the brick was somewhat friable. (2) The oil-bonded brick was found to have very much finer grains of periclase, their average diameter being 0.04 mm. The iron oxide was much less and existed as minute specks of magnesio-ferrite, within the grains of periclase. The individual grains and the groups of grains were well cemented together with crystalline matter in the nature of forsterite and monticellite. The oil brick had a finer, denser, better burned and better cemented texture than the water brick. The pores or voids in the water brick were very much larger than in the oil brick. An important difference between the structure of the bricks was found to be that in the oil-bonded brick the iron constituent of the magnesite was reduced during burning to the basic oxide which in turn combined with the magnesia present to form magnesio-ferrite, which appears to be an important element in the binding medium of this brick. The fact that in the oil-bonded brick the grains or particles are more closely bound together, and that the iron exists in combination with magnesia, gives these bricks a more dense characteristic and a more uniform composition than exists with water-bonded bricks; the resulting denseness causes the oil-bonded bricks to be less porous and less absorptive, and their more uniform composition greatly reduces spalling and cracking.

I am aware that various pulverulent body materials, including magnesite, have been proposed to be united by a temporary bond of some adhesive material of a gummy, mucilaginous or tarry nature, and that boiled linseed oil has been suggested as such a temporary bond; but such bond is used merely to unite the particles of the non-plastic material so that it may be molded, and until the temperature is attained at which the particles will be united by the flux produced by heating them; such temporary bonds burn away and do not appreciably affect the composition of the bricks. According to my invention the linseed or other oil is used under conditions whereby it becomes through preliminary hardening and reaction with the magnesitic material, and upon the subsequent firing, a permanent bond, whereby the material is more effectively and intimately bonded than heretofore, with the result of producing a stronger, denser, more impervious and more resistant refractory.

What I claim is:—

1. The described dense molded magnesite refractory formed from a magnesitic body material which has been mixed with a siccative oil, molded, dried and burned.

2. The described dense molded magnesite refractory composed of a magnesitic body material and a permanent binder comprising linseed oil products, molded, dried and burned.

3. The described molded magnesite refractory composed of a magnesitic body material and a permanent binder formed from a siccative oil, said oil being in proportion approximating .5 to 7 per cent of the body material, molded, dried and burned.

4. The described dense molded magnesite refractory formed from a body material comprising dead-burned magnesite of different degrees of fineness, mixed with a lubricating fatty bonding oil, molded, dried and burned, the finer particles of the body material being within the spaces between the coarser particles.

5. The described molded magnesite refractory formed from a magnesitic body material of different degrees of fineness, mixed with a bonding oil having the properties of penetrating the dry material, coating its particles with a film, lubricating them so that they enter closely together, and whereby the mixture is made plastic, and molded, dried and burned.

6. The described dense magnesite brick formed from dead-burned magnesite and a siccative oil, molded, dried and burned.

7. The described dense magnesite brick formed from dead-burned magnesite and linseed oil, molded, dried and burned.

8. A magnesite brick formed from dead-burned magnesite and linseed oil, the oil in the proportion of approximately 5 to 7 per cent, molded, dried and burned.

9. A magnesite brick formed from dead-burned magnesite and linseed oil, the oil in the proportion of approximately 6.5 per cent, molded, dried and burned.

10. A dense magnesite refractory having a small percentage of voids and low absorption of liquid metals, composed of magnesite of varying degrees of fineness, bonded by linseed oil products, molded, dried and burned.

11. The described method of making magnesite bricks or molded refractories, comprising mixing a pulverized magnesitic body material with a permanent-bonding siccative oil, molding, curing the molded article and burning.

12. The described method of making magnesite bricks or molded refractories, comprising mixing a pulverized magnesitic body material with a siccative oil, molding, drying the molded article to hardness and burning.

13. The described method of making magnesite bricks or molded refractories, comprising mixing a pulverized magnesitic body material with linseed oil, molding, curing the molded article and burning.

14. The described method of making magnesite bricks or molded refractories, comprising mixing a pulverized magnesitic body material of different degrees of fineness with a lubricating fatty oil, molding, drying and burning.

15. The described method of making magnesite bricks or molded refractories, comprising mixing a pulverized magnesitic body material of different degrees of fineness with a lubricating fatty oil, uniting them by prolonged working to produce a plastic mass, molding, drying and burning.

16. The method of making magnesite bricks or molded refractories, comprising mixing pulverized magnesite with linseed oil, molding, curing the molded article and burning.

17. The method of making magnesite bricks or molded refractories, comprising mixing pulverized magnesite with linseed oil, molding, drying the molded article to hardness and burning.

18. The method of making magnesite bricks or molded refractories, comprising mixing pulverized magnesite with linseed oil in a proportion approximating 5 to 7 per cent, molding, drying and burning.

19. The method of making magnesite bricks or molded refractories, comprising mixing pulverized magnesite with linseed oil in a proportion approximating 6.5 per cent molding, drying and burning.

20. The method of making magnesite bricks or molded refractories, comprising mixing pulverized magnesite with linseed oil, molding, drying and burning, the oil being conditioned by heating prior to burning.

21. The method of making magnesite bricks or molded refractories, comprising mixing pulverized magnesite with linseed oil, curing the mixture by standing to increase its viscosity, molding and burning.

22. The method of making magnesite bricks or molded refractories, comprising mixing pulverized magnesite of varying degrees of fineness such that a large proportion will pass a 100 mesh screen, and a large proportion will not pass a 60 mesh screen, with a binder of a fatty siccative oil, molding under pressure to cause the finer particles to enter the spaces between the larger particles, drying and burning.

In witness whereof, I have hereunto signed my name.

AUGUST MARKS.